United States Patent
Cariello et al.

(10) Patent No.: US 12,462,891 B2
(45) Date of Patent: Nov. 4, 2025

(54) MULTI-LEVEL CELL MAINTENANCE OPERATIONS

(71) Applicant: Micron Technology, Inc., Boise, ID (US)

(72) Inventors: Giuseppe Cariello, Boise, ID (US); Nitul Gohain, Karnataka (IN); Jameer Mulani, Karnataka (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/417,737

(22) Filed: Jan. 19, 2024

(65) Prior Publication Data

US 2024/0274215 A1    Aug. 15, 2024

Related U.S. Application Data

(60) Provisional application No. 63/484,729, filed on Feb. 13, 2023.

(51) Int. Cl.
 *G11C 29/42*    (2006.01)
(52) U.S. Cl.
 CPC .................................... *G11C 29/42* (2013.01)
(58) Field of Classification Search
 CPC ................................ G11C 29/42; G11C 29/52
 See application file for complete search history.

(56) References Cited

U.S. PATENT DOCUMENTS

| | | | |
|---|---|---|---|
| 7,924,628 B2* | 4/2011 | Danon | G11C 11/5628 365/185.28 |
| 2015/0117107 A1* | 4/2015 | Sun | G11C 16/225 365/185.12 |
| 2018/0350446 A1* | 12/2018 | K | G11C 29/76 |
| 2020/0234768 A1* | 7/2020 | Lin | G11C 16/10 |
| 2022/0076753 A1* | 3/2022 | Sharma | G11C 16/3459 |
| 2022/0230685 A1* | 7/2022 | Alrod | H10B 41/27 |
| 2022/0342754 A1* | 10/2022 | Eisenhuth | G06F 3/0673 |
| 2023/0023725 A1* | 1/2023 | Singidi | G11C 16/10 |
| 2025/0060894 A1* | 2/2025 | Kanno | G06F 3/0656 |

* cited by examiner

*Primary Examiner* — Albert Decady
*Assistant Examiner* — Enamul M Kabir
(74) *Attorney, Agent, or Firm* — Holland & Hart LLP

(57) ABSTRACT

Methods, systems, and devices for multi-level cell maintenance operations are described. A controller of a memory device may perform a two-portion maintenance operation in order to transfer data from a first block of memory cells to a second block of memory cells. For example, during a first portion of the maintenance operation, the controller may read first data from the first block of memory cells and perform a first error control operation to correct the first data. The controller may store second data associated with the first error control operation to volatile memory of the memory device in response to performing the first error control operation. During a second portion of the maintenance operation, the controller may perform a second error control operation using the second data associated with the first error control operations stored to the volatile memory of the memory device.

20 Claims, 5 Drawing Sheets

MULTI-LEVEL CELL MAINTENANCE OPERATIONS

CROSS REFERENCE

The present application for patent claims priority to U.S. Provisional Patent Application No. 63/484,729 by CARIELLO et al., entitled "MULTI-LEVEL CELL MAINTENANCE OPERATIONS," filed Feb. 13, 2023, which is assigned to the assignee hereof, and which is expressly incorporated by reference in its entirety herein.

TECHNICAL FIELD

The following relates to one or more systems for memory, including multi-level cell maintenance operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
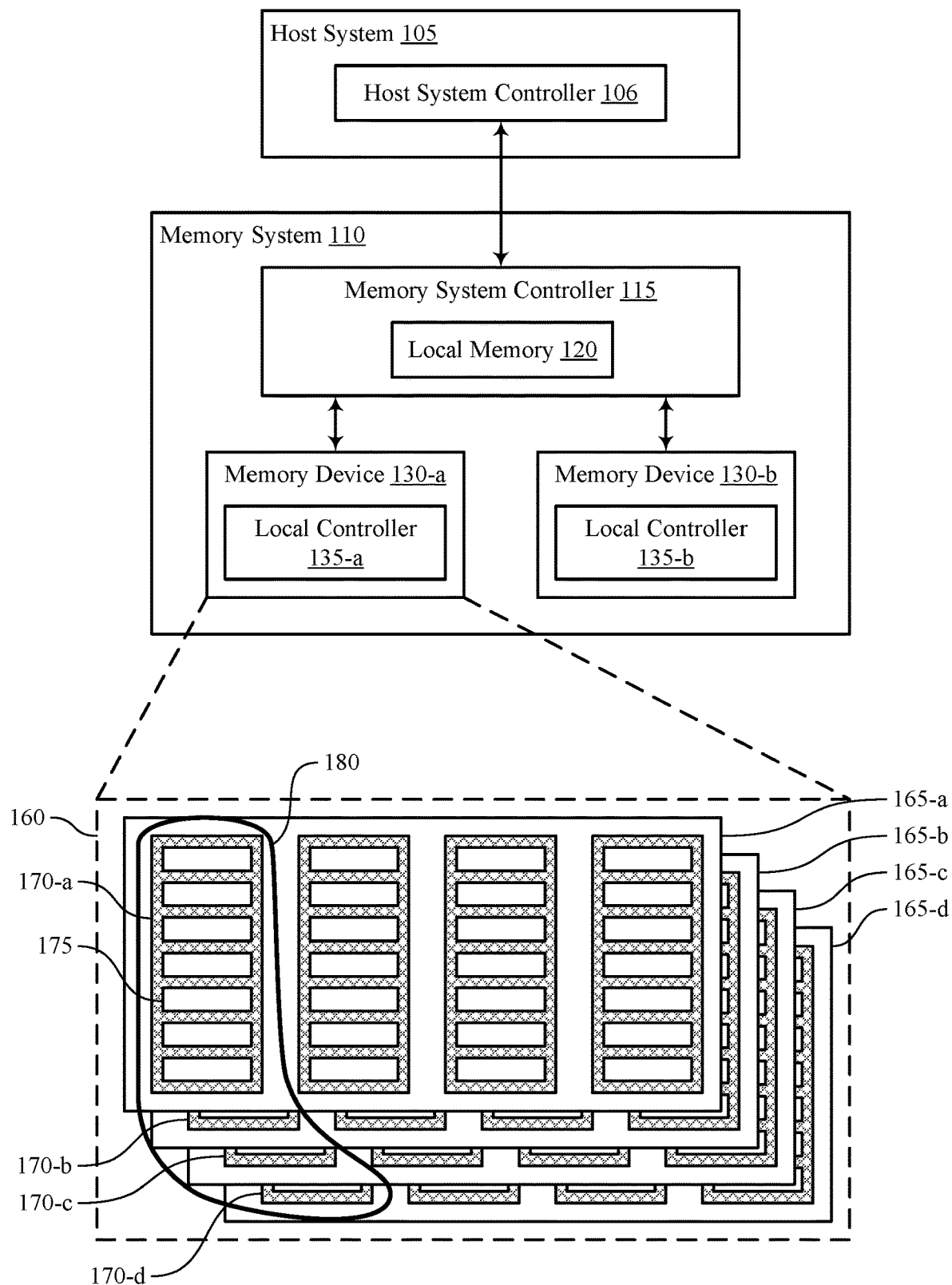
FIG. 1 illustrates an example of a system that supports multi-level cell maintenance operations in accordance with examples as disclosed herein.

Some memory systems may include a quad-level cell (QLC) architecture, where a QLC may store up to four bits of data in a single memory cell. To store up to four bits of data in a QLC, a memory system may use a two-pass write operation where, in a first pass, the controller may use a first type of write operation (e.g., using a relatively coarser write voltage) and during a second pass the controller may use a second type of write operation (e.g., a relatively finer write voltage). A two-pass write operation may be used for a variety of reasons. For example, placing a voltage threshold of a memory cell at one of sixteen states storable by the memory cell may include applying voltage to the memory cell for an extended duration. In some cases, applying a voltage for such a duration may cause damage to the memory cell. Thus, to reduce a likelihood that application of a voltage damages the memory cell while writing QLC data to the memory cell, a two-pass write operation may implemented. In such a two-pass write operation for QLC data, a first pass of a write operation may be an example of a coarse write operation that gets the state of the memory cell partially to the correct state. After the first-pass, the voltage applied to the memory cell may be removed and then reapplied during a second portion of the write operation, which may be an example of a finer write operation that gets the state of the memory cell to the desired state. In some memory systems, a controller of the memory system may perform a two-portion maintenance operation (e.g., such as a two pass garbage collection procedure) to free a block of memory cells from an increased amount of invalid data.

For example, during a first portion of the maintenance operation, the controller may read data from a first block of memory cells (e.g., QLCs), perform a first error control operation on the data, and write the corrected data to a second block of memory cells using the first type of write operation (e.g., the coarse write voltage). Additionally, the controller may perform a second portion of the maintenance operation to read the data from the first block, perform a second error control operation, and write the corrected data to the second block using the second type of write operation (e.g., the finer write voltage). After writing the corrected data to the second block, the controller may erase the data from the first block of memory cells, thereby completing the two-portion maintenance operation and freeing the first block of memory cells.

In some cases, however, multiple additional read operations may be performed on the first block between the first and second portions of the maintenance operation or a longer duration may occur between the first portion and the second portion, which may reduce the reliability of the first block of memory cells. While the data stored in the first block may have had one or more correctable errors during the first portion, during the second portion, the controller may identify one or more uncorrectable errors in the data stored in the first block, thereby reducing the reliability of the memory system. Further, if one or more correctable errors have been found during the first portion that reads the data from the first block, it may increase the latency of the two-pass write operation to re-do the error correction during the second portion that reads the data from the first block again.

The techniques described herein may enable a memory system to store data associated with a first error control operation to a portion of the memory system (e.g., non-volatile memory, static random access memory (SRAM), or volatile memory), where the controller may use such data during the second portion of the maintenance operation (e.g., during the second error control operation). For example, the controller may perform the first error control operation on the data read from the first block as part of the first portion and may determine whether one or more characteristics (e.g., a bit error rate (BER) or a latency associated with the error control operation) satisfies a threshold.

If the controller determines that the one or more thresholds have been satisfied, the controller may write the corrected data to a third block of single level cells (SLCs) (e.g., cells configured to store a single bit of data) and may store the location of the third block to the portion of the memory. Thus, during the second portion of the maintenance operation, the controller may retrieve, from the portion of the memory, the location of the corrected data instead of reading the first block again and re-running the error control operations on the data. The memory system may read the corrected data from the third block and write the corrected data to the second block, thereby eliminating the second error control operation.

If the controller determines that the one or more thresholds have not been satisfied, the controller may store one or more parameters associated with the first error control operation (e.g., the "recipe" or procedure of the first error control operation) to a portion of the memory. In such examples, the controller may use the stored parameters to perform the second error control operation, thereby reducing latency incurred due to the two-portion maintenance operation. In this way, the controller of the memory system may use the stored data to decrease latency in the memory system and increase the reliability of the two-portion maintenance operation.

In addition to applicability in memory systems as described herein, techniques for MLC maintenance operations may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by decreasing the latency during two-portion maintenance operations, while improving the reliability of the two-portion maintenance operation.

Figure 2:
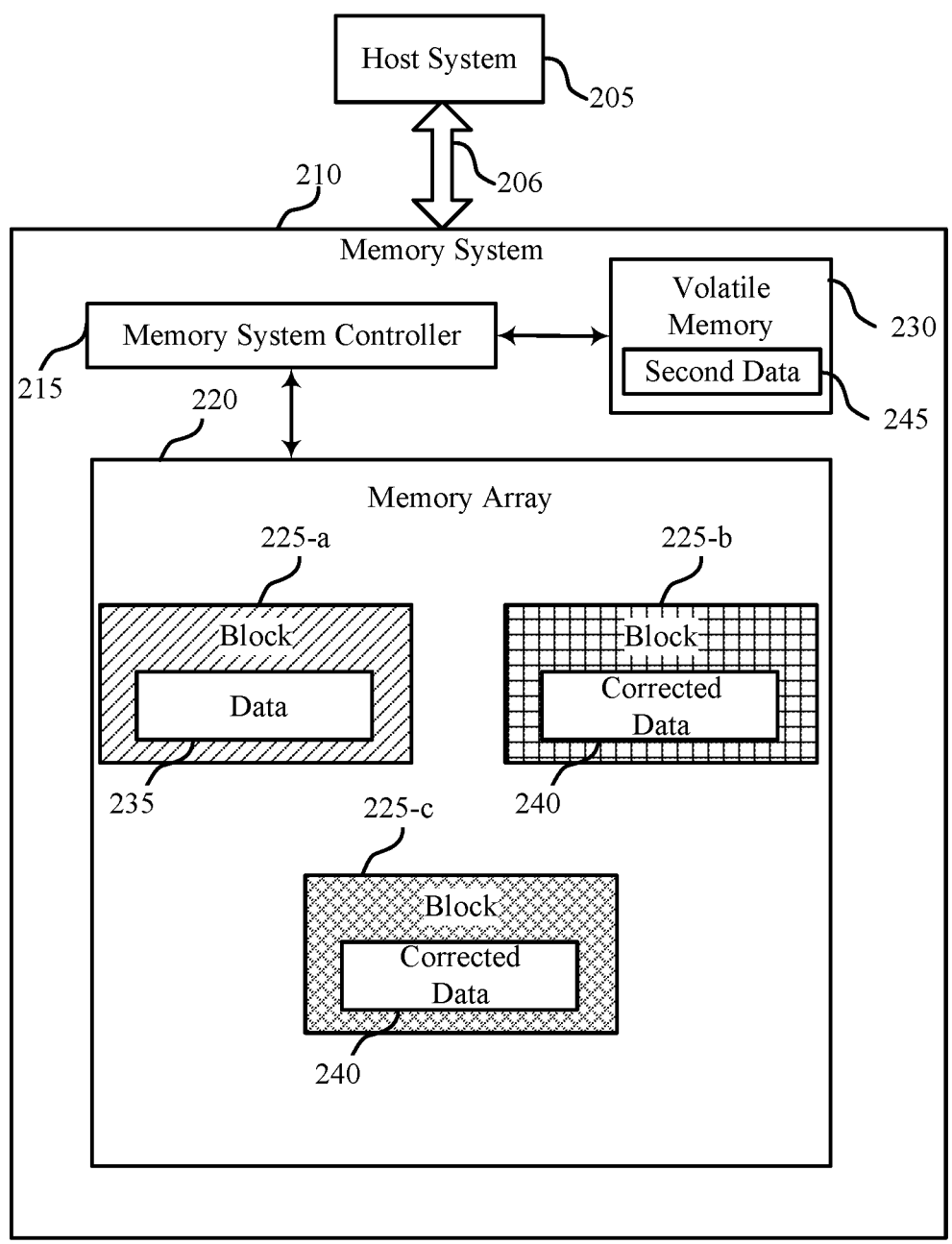
FIG. 2 illustrates an example of a system that supports multi-level cell maintenance operations in accordance with examples as disclosed herein.

Features of the disclosure are initially described in the context of systems, devices, and circuits with reference to FIGS. 1 and 2. Features of the disclosure are described in the context of a process flow with reference to FIG. 3. These and other features of the disclosure are further illustrated by and described in the context of an apparatus diagram and flowchart that relate to multi-level cell maintenance operations with reference to FIGS. 4 and 5.

FIG. 1 illustrates an example of a system 100 that supports multi-level cell maintenance operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include SRAM or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support multi-level cell maintenance operations. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The techniques described herein may enable the memory system controller 115 to store data associated with the first error control operation to a portion of the memory system 110 (e.g., such as an SLC block, SRAM, or portions of volatile memory not shown in FIG. 1), where memory system controller 115 may use such data during the second portion of the maintenance operation (e.g., during the second error control operation). For example, the memory system controller 115 may perform the first error control operation on the data read from the block 170-a and may determine whether one or more characteristics (e.g., BER or a latency associated with the error control operation) satisfies a threshold.

If the memory system controller 115 determines that the one or more thresholds have been satisfied, the memory system controller 115 may write the corrected data to a third block of SLCs, such as block 170-c, and may store the location of the block 170-c to the portion of the memory system 110. Thus, during the second portion of the maintenance operation, memory system controller 115 may retrieve, from the portion of the memory, the location of the corrected data, read the corrected data from the block 170-c, and write the corrected data to the block 170-b, thereby eliminating the second error control operation.

If the memory system controller 115 determines that the one or more thresholds have not been satisfied, the memory system controller 115 may store one or more parameters associated with the first error control operation (e.g., the "recipe" or procedure of the first error control operation) to a portion of the memory system 110. In such examples, the memory system controller 115 may use the stored parameters to perform the second error control operation, thereby reducing latency incurred due to two-portion maintenance operations. In this way, the controller of the memory system may use the stored data to decrease latency in the memory system and increase the reliability of the two-portion maintenance operation.

FIG. 2 illustrates an example of a system 200 that supports multi-level cell maintenance operations in accordance with examples as disclosed herein. The system 200 may implement, or be implemented by, aspects of the system 100 with respect to FIG. 1. For example, the system 200 may include a host system 205, an interface 206, a memory system 210, a memory system controller 215, a memory array 220, one or more blocks 225, which may be examples of corresponding components or devices described herein with reference to FIG. 1. The system 200 may support techniques for storing second data 245 associated with a first error correction operation for use in a second error correction operation during a two-portion maintenance operation, which may reduce the overall latency and improve the overall reliability of the system 200.

The memory system 210 may be configured to receive one or more access commands from the host system 205. In some cases, the memory system 210 may be configured to store data 235 received from the host system 205 in response to receiving a write command. In some other cases, the memory system 210 may be configured to transmit data 235 to the host system 205 in response to receiving a read command. For example, the memory system 210 may include the memory system controller 215 that is coupled with the memory array 220. The memory array 220 may include one or more blocks 225 (e.g., block 225-a, block 225-b, and block 225-c) of memory cells.

If the host system 205 transmits a read command to the memory system 210, the memory system controller 215 may be configured to read from (e.g., access) one of the blocks 225 corresponding to the requested data and transmit the data to the host system via the interface 206. If the host system 205 transmits a write command to the memory system 210, the memory system controller 215 may be configured to receive the data to be stored (e.g., written) from the host system 205 and write the data to one of the blocks 225 of the memory array 220. Further, the memory system 210 may include the volatile memory 230, which may be an example of SRAM, among other types of volatile memory. The memory system controller 215 may be coupled with the volatile memory and configured to access (e.g., read from or write to) the volatile memory to perform one or more functions described herein.

One or more blocks 225 in the memory array 220 may be configured as a QLC block. To write data to QLC blocks a two-pass write operation may be used. A QLC memory cell may be capable of storing sixteen separate states (e.g., to represent four bits of data). Placing a voltage threshold of a memory cell at one of the sixteen states storable by the memory cell may include applying voltage to the memory cell for an extended duration. In some cases, applying a voltage for such a duration may disturb adjacent memory cells. Another undesirable effect is the shift of the cell voltage due to capacitive coupling with adjacent programmed cells. Thus, to reduce a likelihood of these errors, a two-pass write operation may be implemented. In such a two-pass write operation for QLC data, a first pass of a write operation may be implemented, the voltage may be removed from the memory cell, and a second-pass of the write operation may be applied at a later time, after roughly placing the cells of adjacent pages. The first pass of the write operation may be an example of a coarse write operation that gets the state of the memory cell partially to the correct state. The second pass of the write operation may be an example of a finer write operation that moves the state of the memory cell from the state stored during the first pass to the desired state.

During the first pass of the two-pass write operation, the memory system controller 215 may apply a voltage to the QLCs in one of the blocks 225, where the applied voltage may correspond to one of multiple voltage distributions within the QLC (e.g., the memory system controller 215 may write a relatively coarser or less-specific voltage during the first pass). In such cases, each voltage distribution within a QLC may correspond to one of four bits of data (e.g., a QLC may store four bits of data using 16 different voltage levels or distributions). During the second pass of the two-pass write operation, the memory system controller 215 may apply a second voltage to the QLC to ensure the stored data of the QLC is within the desired voltage distribution (e.g., the memory system controller 215 may write a finer or more specific voltage). Thus, the memory system controller 215 may store four bits of data 235 to one or more QLCs in one of the blocks 225 using the two-pass write operation.

In some cases, the memory system controller 215 may be configured to perform a maintenance operation (e.g., such as a garbage collection procedure) on one or more blocks 225 in the memory array 220. For example, within the memory array 220, a block 225-*a* may have one or more pages (e.g., sets of memory cells) containing valid data 235 and some pages containing invalid data 235. To avoid waiting for all of the pages in the block 225-*a* to have invalid data 235 and in order to erase and reuse the block 225-*a*, the memory system controller 215 may perform the maintenance operation (e.g., an algorithm referred to as "garbage collection") to erase and release the invalid data 235 from the block 225-*a*, such that the block 225-*a* may be a free block for subsequent write operations. As an illustrative example of the maintenance operation, the memory system controller 215 may select the block 225-*a*, where the block 225-*a* contains valid and invalid data 235, select one or more pages in the block 225-*a* that contain valid data 235, copy the valid data 235 from the selected pages of block 225-*a* to new locations within the memory array 220 (e.g., such as the block 225-*b*), mark the data 235 in the previously selected pages of block 225-*a* as invalid, and erase the block 225-*a*. As a result, the quantity of blocks 225 in the memory array 220 that have been erased may be increased such that more blocks 225 are available to store subsequent data 235 (e.g., data 235 subsequently received from the host system 205).

To perform the maintenance operation one of the blocks 225 that stores QLC data, the memory system controller 215 may be configured to perform a two-portion (e.g., a two-pass) maintenance operation (e.g., due to the two-pass write operation involved in writing to the QLCs and limited resources in the volatile memory 230). For example, the memory system controller 215 may select the block 225-*a* that has data 235 stored in one or more QLCs of the block 225-*a*. During a first portion of the maintenance operation, the memory system controller 215 may read the data 235 from the one or more QLCs of the block 225-*a*. As part of the read operation, one or more error control operation (e.g., error correction code (ECC) operation) may be performed. If the data 235 read from the one or more QLCs in the block 225-*a* (e.g., source data) includes one or more correctable errors (based on performing the ECC operation, the memory system controller 215 may correct the data 235. The memory system controller 215 may then perform a first pass of the write operation to the target QLC block (e.g., block 225-*b*) and write the corrected data 240 (e.g., a corrected version of data 235) to one or more QLCs in the block 225-*b* (e.g., the second block of memory cells). Block 225-*b* may also be referred to as a fourth block of memory cells or a fifth block of memory cells.

During a second portion of the maintenance operation, the memory system controller 215 may read from the block 225-*a* for a second time and perform a second error control operation on the data 235 to correct and retrieve the data 235. In some cases, during the second portion of the maintenance operation, the memory system controller 215 may read the data 235 for a second time from the source QLC block and perform error control operations that are similar to, or the same as, the first error control operations. In such cases, the memory system controller 215 may write the corrected data 240 to the block 225-*b* (e.g., the target QLC block) as part of a second pass of the write operation and erase the data 235 from the block 225-*a*, thereby completing the two-portion maintenance operation.

However, in some cases, between the first portion of the maintenance operation and the second portion of the maintenance operation, the memory system controller 215 may perform one or more read operations on the block 225-*a*, which may further reduce the reliability of the of the data 235 in block 225-*a*. Additionally, or alternatively, a longer duration may occur between the first portion of the maintenance operation and the second portion of the maintenance operation due to the memory system performing other operations. In such examples, the memory system controller 215 may fail to correct and retrieve the data 235 during the second portion of the maintenance operation (e.g., the data from the source QLC block includes one or more uncorrectable errors).

The techniques described herein may enable the memory system controller 215 to store second data 245 associated with the first error control operation to a portion of the memory system (e.g., SLC block or volatile memory 230), where the system controller may use the second data 245 during the second portion of the maintenance operation. In some cases, the second data 245 may be enable the memory system to skip the error control operation for the second portion or it may enable to the memory system to reduce the latency from performing such error control operations for the second portion. For example, the memory system controller 215 may perform the first error control operation on the data 235 (e.g., first data) read from the block 225-*a* and determine whether the first error control operation, the data 235, or both satisfy one or more thresholds. For instance, if the data 235 includes one or more correctable errors, the corrected data may be stored in SLC blocks or volatile memory. The memory system may compare the data to one or more thresholds to determine how close the data 235 may be to experiencing an uncorrectable error. In one example, after performing the first error control operation, the memory system controller 215 may be configured to compare the BER of the data 235 with a BER threshold (e.g., a first threshold configured for an acceptable BER of the data 235). In another example, the memory system controller 215 may be configured to compare the latency of the first error control operation to a latency threshold (e.g., a second threshold configured for an acceptable amount of time to perform the first error control operation).

The memory system controller 215 may determine that the one or more thresholds have not been satisfied, which may mean that the data 235 is not as close to experiencing an uncorrectable error. In such cases, the memory system controller 215 may, during the first portion of the maintenance operation, store the second data 245 to the volatile memory 230 and write the corrected data 240 to the block 225-*b* (e.g., a second block configured to store four or more bits). In such examples, the second data 245 may include one or more parameters associated with the first error control operation (e.g., the recipe or procedure of the first error control operation), such as the read voltage level for retrieving the data 235. That is, to avoid performing the same, or similar, error control operations during the second portion of the maintenance operation, the memory system controller 215 may be configured to generate a dedicated data structure (e.g., such as a mapping table, look-up table, or change-log) in volatile memory 230 to record the second data 245. As such, the memory system controller 215 may, during the second portion of the maintenance operation, use the second data 245 to retrieve the data 235 from the block 225-*a* (e.g., rather than performing similar operations as those of the first error control operation) and write the corrected data 240 to the block 225-*b*, thereby reducing the latency in the two-portion maintenance operation.

The entries in the dedicated data structure may be updated after each portion of the maintenance operation in order to maintain relevant second data 245 in the volatile memory 230. Further, the memory system controller 215 may be configured to keep the quantity of entries relatively small (e.g., in order to not use all of the space in the volatile memory 230). As an illustrative example, if the distance between two-portions of the maintenance operation in a block 225 is a wordline, with four sub-blocks, the memory system controller 215 may be configured to store second data 245 that is associated with 20 pages of data per block 225, where the total quantity of entries in the data structure would contain 20 pages multiplied by four codewords, multiplied by the quantity of planes and die records (e.g., 20 pages*4CW*quantity of planes*die records). As such, if the system 200 included four die and six planes, the memory system controller 215 may be configured to generate the dedicated data structure with 1920 entries (e.g., 20*4*4*6=1920). Moreover, the memory system controller 215 may be configured to compress the dedicated data structure in the volatile memory 230 to be one byte per entry (e.g., error handling <256) or group the second data 245 in a bitmap or list.

If the controller determines that at least one of the thresholds has been satisfied (e.g., BER or latency threshold), the controller may write, during the first portion of the maintenance operation, the corrected data 240 to a block 225-*c* (e.g., temporarily store the corrected data 240 in a third block) that includes SLCs and store the second data 245 to the volatile memory 230, where the second data 245 may include the location of the corrected data 240 in the block 225-*c*. Further, the memory system controller 215 may be configured to write the corrected data 240 to the block 225-*b* as part of the first portion of the maintenance operation.

For example, if the memory system controller 215 determines, during the first portion of the maintenance operation, that the data 235 is close to being uncorrectable due to a deep step in the first error operations (e.g., an increased workload of one or more error correction operations to correct the data 235) or the BER of the data 235 is relatively high (e.g., the BER threshold is met meaning the error correction operation may not be reliable), then the memory system controller 215 may write (e.g., backup) the corrected data 240 to the block 225-*c* of SLCs. Likewise, the memory system controller 215 may determine that the latency associated with performing the first error control operation satisfies the second threshold (e.g., latency threshold which might be set equal to a program time in SLC mode) and write the corrected data 240 to the block 225-*c*.

In such examples, the location of the corrected data 240 in the block 225-*c* (e.g., the location of the SLC backed-up data) may be stored in the entries of the dedicated data structure (e.g., mapping table or change log) in the volatile memory 230. As such, during the second portion of the maintenance operation, the memory system controller 215 may be configured to retrieve the location of the corrected data 240 in the block 225-*c* from the volatile memory 230. In response to retrieving the location of the corrected data 240 in the block 225-*c*, the memory system controller 215 may retrieve the corrected data 240 from the block 225-*c* (e.g., of SLCs) and write the corrected data 240 to the block 225-*b*. in favor of performing the second portion of the maintenance operation (e.g., second phase of a garbage collection operation).

In some examples, the block 225-*c* (e.g., third block of SLCs) may be the same block 225 that the memory systems 210 uses for data backup as a result of asynchronous power loss, where metadata associated with the corrected data 240 may be also stored in the block 225-*c*. Thus, in the case of power loss, the memory system controller 215 may use the metadata to distinguish whether data stored in the block 225-*c* belongs to the maintenance operation or is other data recovered during a precedent power loss handling.

In some examples, the host system 205 may transmit a read command, to read corrected data 240 from the block 225-*b* prior to the two-portion maintenance operation being completed (e.g., prior to the second write being completed). In such examples, the memory system controller 215 may be configured to retrieve the location of the corrected data 240 from the volatile memory 230 (e.g., which may be automatic if the second data 245 is stored in a change log in volatile memory 230, but may lead to the addition of a lookup step if the second data is stored in the mapping table), read the corrected data 240 from the block 225-*c*, and transmit the corrected data 240 to the host device via the interface 206.

Further, in some examples, the memory system controller 215 may be configured to back up the corrected data 240 to the block 225-*c* and store the location (e.g., second data 245) of the corrected data 240 in volatile memory 230 in cases where the first error control operation may be reliably repeated (e.g., the data does not have high BER) but the latency of the first error control operation satisfies the latency threshold. For example, the memory system controller 215 may be configured to use a relatively higher latency algorithm (e.g., such as TurboRAIN or Dynamic XOR) to perform the first error control operation. As such, instead of replicating such algorithms during the second portion of the maintenance operation, the memory system controller 215 may be configured to back up the corrected data 240 to the block 225-*c* even in cases that the data 235 can be reliably repeated, thereby reducing latency during the two-portion maintenance operation.

Figure 3:
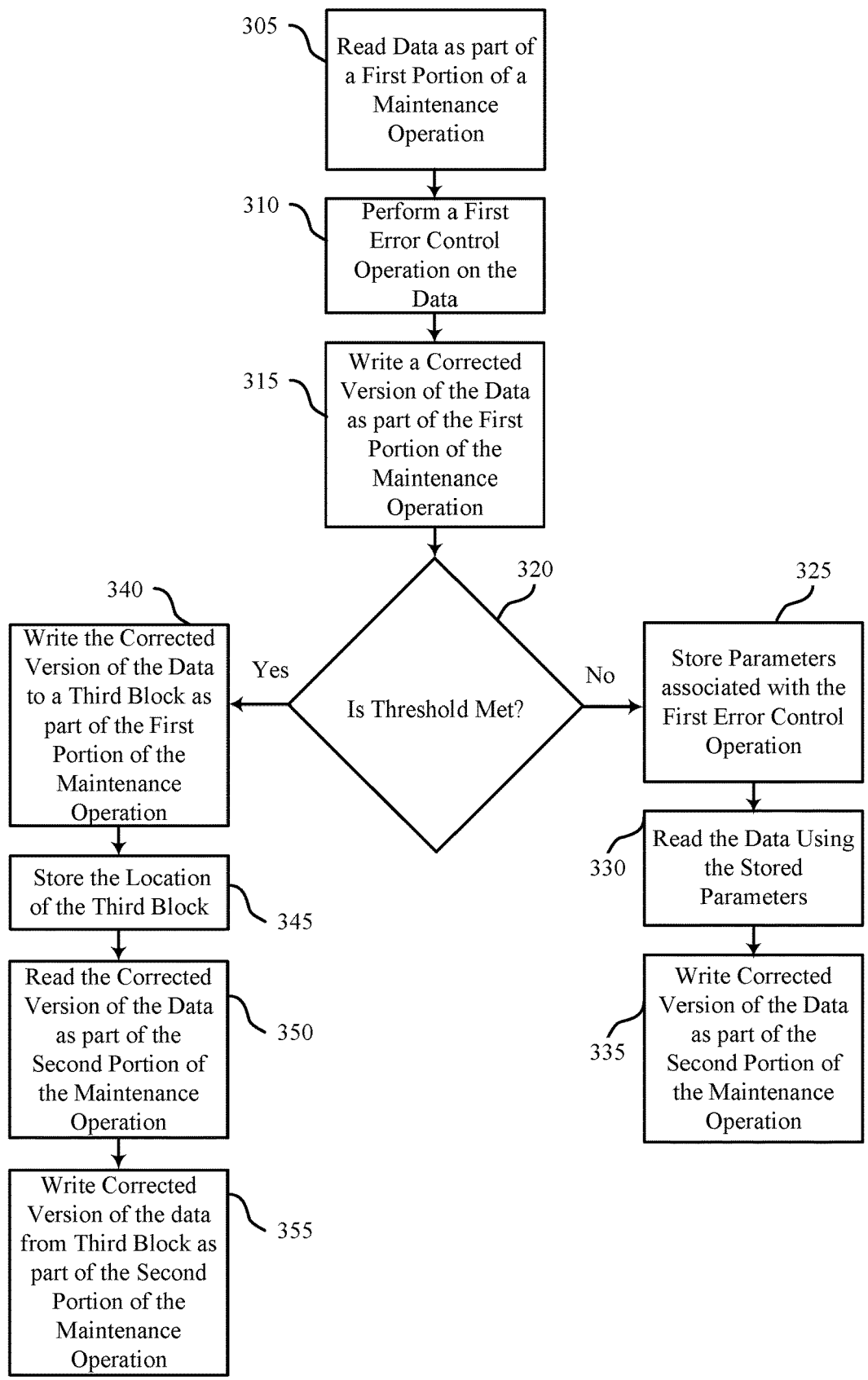
FIG. 3 illustrates an example of a process flow that supports multi-level cell maintenance operations in accordance with examples as disclosed herein.

FIG. 3 illustrates an example of a process flow 300 that supports multi-level cell maintenance operations in accordance with examples as disclosed herein. Aspects of the process flow 300 may be implemented by a controller, such as a memory system controller 115, a memory system controller 215, as described herein with reference to FIGS. 1 and 2, among other components. Additionally, or alternatively, aspects of the process flow 300 may be implemented as instructions stored in memory (e.g., firmware stored in a memory coupled with the memory system). For example, the instructions, when executed by the controller (e.g., the memory system controller 215), may cause the controller to perform the operations of the process flow 300. The process flow 300 may support techniques for storing second data 245 associated with a first error correction operation for use in a second error correction operation during a two-portion maintenance operation, which may reduce the overall latency and improve the overall reliability of the system 200.

The controller may execute one or more operations of the process flow 300 during a two-portion maintenance operation on multiple blocks of memory cells in a memory system. In such examples, one or blocks of the memory cells may be configured to store four or more bits (e.g., QLCs), while other blocks of memory cells may be configured to store a single bit (e.g., SLCs). The controller may execute such operations to reduce latency and mitigate errors during the two-portion maintenance operation.

At 305, first data may be read from a first block of memory cells. For example, the controller may read, during a first portion of the two-portion maintenance operation, the first data (e.g., such as data 235) from the first block of memory cells (e.g., such as block 225-a), where the first block of memory cells may be configured to store four or more bits of data. At 310, a first error control operation may be performed. For example, the controller may perform, during the first portion of the maintenance operation, the first error control operation on the first data to correct the first data.

At 315, a corrected version of the first data may be written to a second block. For example, the controller may write, during the first portion of the maintenance operation, a corrected version of the first data to a second block, where the second block may be configured to store four or more bits of data. In some examples, the controller may use a first type of write operation (e.g., a coarser or broader write) to write the corrected version of the first data to the second block. The second block may be an example of the block 225-b as described herein with reference to FIG. 2. Additionally, the corrected version of the first data may be an example of the corrected data 240.

At 320, a first and second threshold may be compared with the first error control operation. For example, the controller may determine whether a BER of the first data satisfies a first threshold (e.g., a BER threshold that defines an acceptable amount of BER for the first data) and whether a latency associated with the first error control operation satisfies a second threshold (e.g., a latency threshold that defines an acceptable amount of latency during the first error control operation). For example, the controller may compare the error control operations, the first data, or both to the thresholds to determine whether the first data of the first block is experiencing an uncorrectable error or incurring unwanted latency in the memory system. As such, if the thresholds have been met, the controller may perform operations 340-355 to prevent the first data from being uncorrectable (e.g., by storing the corrected data in a SLC and retrieving the corrected data during the second portion of the maintenance operation), thereby increasing the reliability of the memory system. Likewise, if the thresholds have not been met (e.g., meaning the data is not close to having uncorrectable errors), the controller may perform operations 325-335 to reduce latency caused by performing the error control (e.g., reduce latency caused by performing two ECC operations). In some examples, the first and second thresholds may be configured by the controller of memory system, the controller of the host system, or pre-defined (e.g., during manufacturing of the device).

At 325, second data may be stored to a portion of the memory device. For example, the controller may store, during the first portion of the maintenance operation, the second data associated with the first error control operation to a portion of the memory device, where the second data may include one or more parameters associated with the first error control operation. The one or more parameters may include the operations performed in the first error control operation (e.g., the recipe of the first error control operation), the read level of the first data, or a combination thereof. The portion of the memory device may be an example of the volatile memory 230, where the controller may generate a dedicated data structure to store the second data (e.g., a mapping table, change log, or both).

At 330, the first data may be read from the first block for a second time using the stored second data. For example, the controller may read, during a second portion of the maintenance operation, the first data from the first block for a second time using the read parameters stored at 320 (e.g., using optimized read parameters). For example, the controller may retrieve the one or more operational parameters (e.g., second data) from the portion of the memory (e.g., volatile memory) and use the one or more operational parameters (e.g., read level) to read and correct the first data instead of performing a full error control operation.

At 335, the corrected version of the first data may be written to the second block. For example, the controller may write, during the second portion of the maintenance operation, the corrected version of the first data (e.g., corrected using the second data stored in the portion of the memory device) to the second block of memory cells using a second type of write operation (e.g., a finer or more precise write operation) different from the first type of write operation. In this way, if the controller determines that neither threshold has been met, the controller may reduce the latency associated with performing two error control operations in a two-portion maintenance operation.

Alternatively, as described herein, if the controller determines, at 320, that either of the thresholds (e.g., BER or latency thresholds) have been met, the controller may proceed to 340.

At 340, the corrected version of the first data may be written to a third block of memory cells. For example, the controller may, during the first portion of the maintenance operation, write the corrected version of the first data to a third block, where each memory cell of the third block of memory cells is configured to store a single bit of data (e.g., SLCs). The third block may be an example of the block 225-c as described herein with reference to FIG. 2. At 345, the location of the third block of memory cells may be stored. That is, the controller may store the location of the third block (e.g., location of the corrected version of the data) to the portion of the memory (e.g., volatile memory, such as SRAM).

At 350, the corrected version of the first data may be read from the third block. For example, during the second portion of the maintenance operation, the controller may read the corrected version of the first data from the third block. That is, the controller may retrieve the location of the third block from the portion of the memory (e.g., from the dedicated data structure in the volatile memory) and read the corrected version of the first data from the third block in response to retrieving the location of the third block of memory cells.

At 355, the corrected version of the first data may be written to the second block. That is, the controller may write, during the second portion of the maintenance operation, the corrected version of the first data from the third block to the second block using the second type of write operation (e.g., finer or more specific write operation). In this way, the controller may refrain from performing the second error control operation in favor of writing the corrected version of the first data from the third block of memory cells to the second block of memory cells, thereby reducing latency and mitigating errors in the two-portion maintenance operation.

Figure 4:
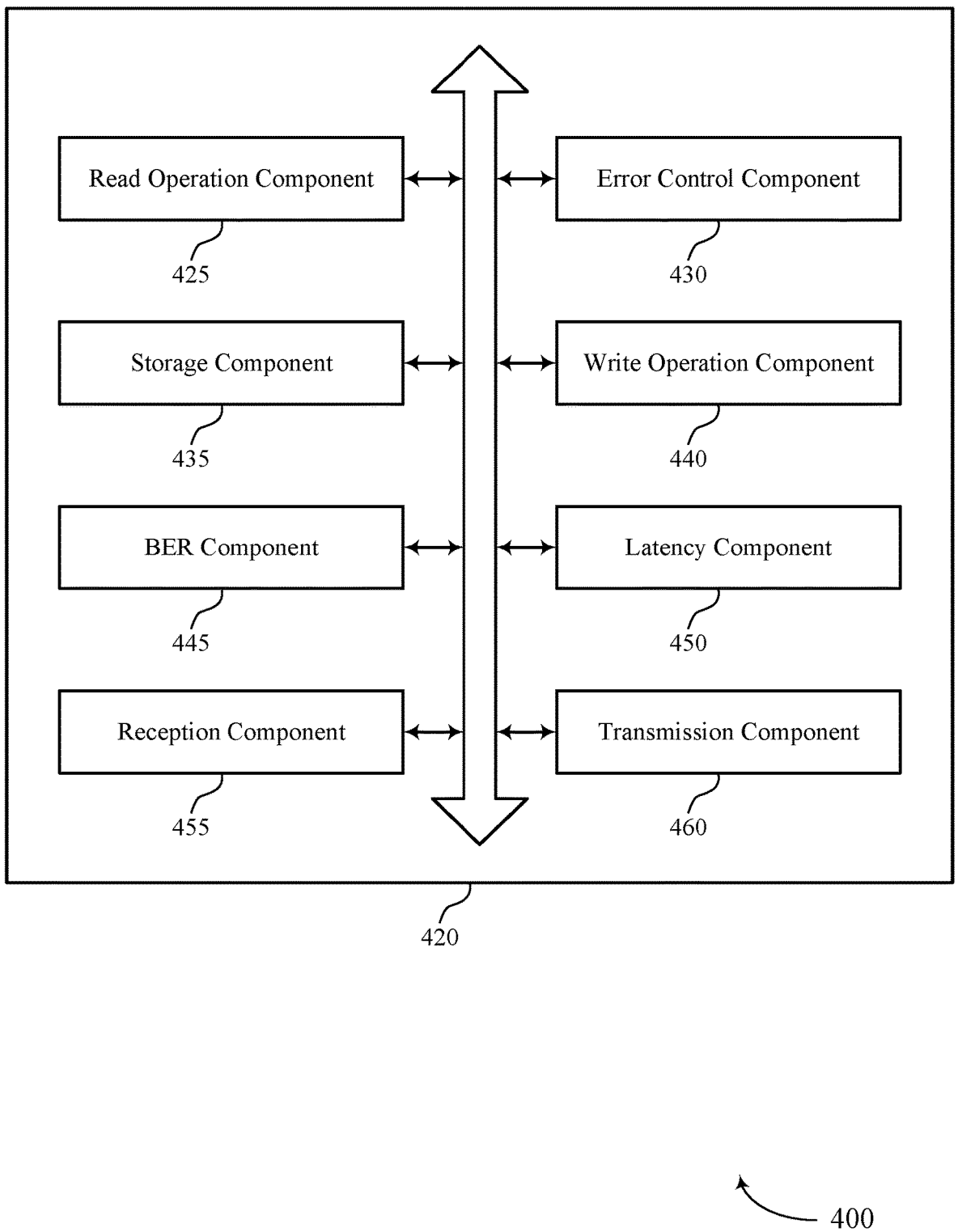
FIG. 4 illustrates a block diagram of an apparatus that supports multi-level cell maintenance operations in accordance with examples as disclosed herein.

FIG. 4 illustrates a block diagram 400 of a memory system 420 that supports multi-level cell maintenance operations in accordance with examples as disclosed herein. The memory system 420 may be an example of aspects of a memory system as described with reference to FIGS. 1 through 3. The memory system 420, or various components thereof, may be an example of means for performing various aspects of multi-level cell maintenance operations as described herein. For example, the memory system 420 may include a read operation component 425, an error control component 430, a storage component 435, a write operation component 440, a BER component 445, a latency component 450, a reception component 455, a transmission component 460, or any combination thereof. Each of these components may communicate, directly or indirectly, with one another (e.g., via one or more buses).

The read operation component 425 may be configured as or otherwise support a means for reading, during a first portion of a maintenance operation, first data from a first block of memory cells of a memory device, the maintenance operation to transfer the first data from the first block to a second block using a two-pass write operation. The error control component 430 may be configured as or otherwise support a means for performing, during the first portion of the maintenance operation, a first error control operation on the first data to correct the first data based at least in part on reading the first data from the first block of memory cells. The storage component 435 may be configured as or otherwise support a means for storing second data associated with the first error control operation to a portion of the memory device based at least in part on performing the first error control operation on the first data read from the first block of memory cells. The error control component 430 may be configured as or otherwise support a means for performing, during a second portion of the maintenance operation, a second error control operation using the second data associated with the first error control operation stored to the portion of the memory device.

In some examples, to support storing the second data associated with the first error control operation, the storage component 435 may be configured as or otherwise support a means for storing one or more parameters associated with the first error control operation to the portion of the memory device, where the second data associated with the first error control operation includes the one or more parameters.

In some examples, the read operation component 425 may be configured as or otherwise support a means for reading, during the second portion of the maintenance operation, the first data from the first block of memory cells for a second time. In some examples, the write operation component 440 may be configured as or otherwise support a means for writing, during the second portion of the maintenance operation, a corrected version of the first data to the second block of memory cells based at least in part on performing the second error control operation.

In some examples, the write operation component 440 may be configured as or otherwise support a means for writing the first data read from the first block of memory cells of the memory device to a third block of memory cells based at least in part on performing the first error control operation, where each memory cell of the third block of memory cells is configured to store a single bit of data, where storing the second data associated with the first error control operation includes storing a location of the third block of memory cells to the portion of the memory device.

In some examples, the read operation component 425 may be configured as or otherwise support a means for reading, during the second portion of the maintenance operation, the first data from the third block of memory cells based at least in part on the location of the third block of memory cells stored to the portion of the memory device. In some examples, the write operation component 440 may be configured as or otherwise support a means for writing, during the second portion of the maintenance operation, the first data read from the third block of memory cells to a fourth block of memory cells, where each memory cell of the fourth block of memory cells is configured to store four or more bits of data.

In some examples, the BER component 445 may be configured as or otherwise support a means for determining that a bit error rate of the first data read from the first block of memory cells satisfies a first threshold based at least in part on performing the first error control operation, where writing the first data to the third block of memory cells is based at least in part on determining that the bit error rate of the first data satisfies the first threshold.

In some examples, the latency component 450 may be configured as or otherwise support a means for determining that a latency associated with performing the first error control operation satisfies a second threshold based at least in part on performing the first error control operation, where writing the first data to the third block of memory cells is based at least in part on determining that the latency associated with performing the first error control operation satisfies the second threshold.

In some examples, the reception component 455 may be configured as or otherwise support a means for receiving, from a host device, a read command associated with the first data prior to performing the second portion of the maintenance operation. In some examples, the read operation component 425 may be configured as or otherwise support a means for reading the first data from the third block of memory cells based at least in part on receiving the read command. In some examples, the transmission component 460 may be configured as or otherwise support a means for transmitting the first data to the host device based at least in part on reading the data from the third block of memory cells.

In some examples, the write operation component 440 may be configured as or otherwise support a means for writing, during a first pass of the two-pass write operation, a corrected version of the first data to the second block using a first type of write operation based at least in part on storing the second data associated with the first error control operation to the portion of the memory device. In some examples, the read operation component 425 may be configured as or otherwise support a means for reading, during the second portion of the maintenance operation, the first data from the first block of memory cells for a second time based at least in part on writing the corrected version of the first data to the second block using the first type of write operation. In some examples, the write operation component 440 may be configured as or otherwise support a means for writing, during a second pass of the two-pass write operation, the corrected version of the first data to the second block using a second type of write operation different than the first type of write operation based at least in part on performing the second error control operation using the second data.

In some examples, the write operation component 440 may be configured as or otherwise support a means for writing, during the first portion of the maintenance operation, the first data read from the first block of memory cells to a fifth block of memory cells based at least in part on performing the first error control operation, where each memory cell of the fifth block of memory cells is configured to store four or more bits of data.

In some examples, the maintenance operation includes the first portion of the maintenance operation and the second portion of the maintenance operation.

In some examples, to support storing the second data to the portion of the memory device, the storage component 435 may be configured as or otherwise support a means for storing the second data to a mapping table, a change log, or both of the memory device.

In some examples, the portion of the memory device includes a volatile memory device.

In some examples, each memory cell of the first block is configured to store four or more bits of data.

Figure 5:
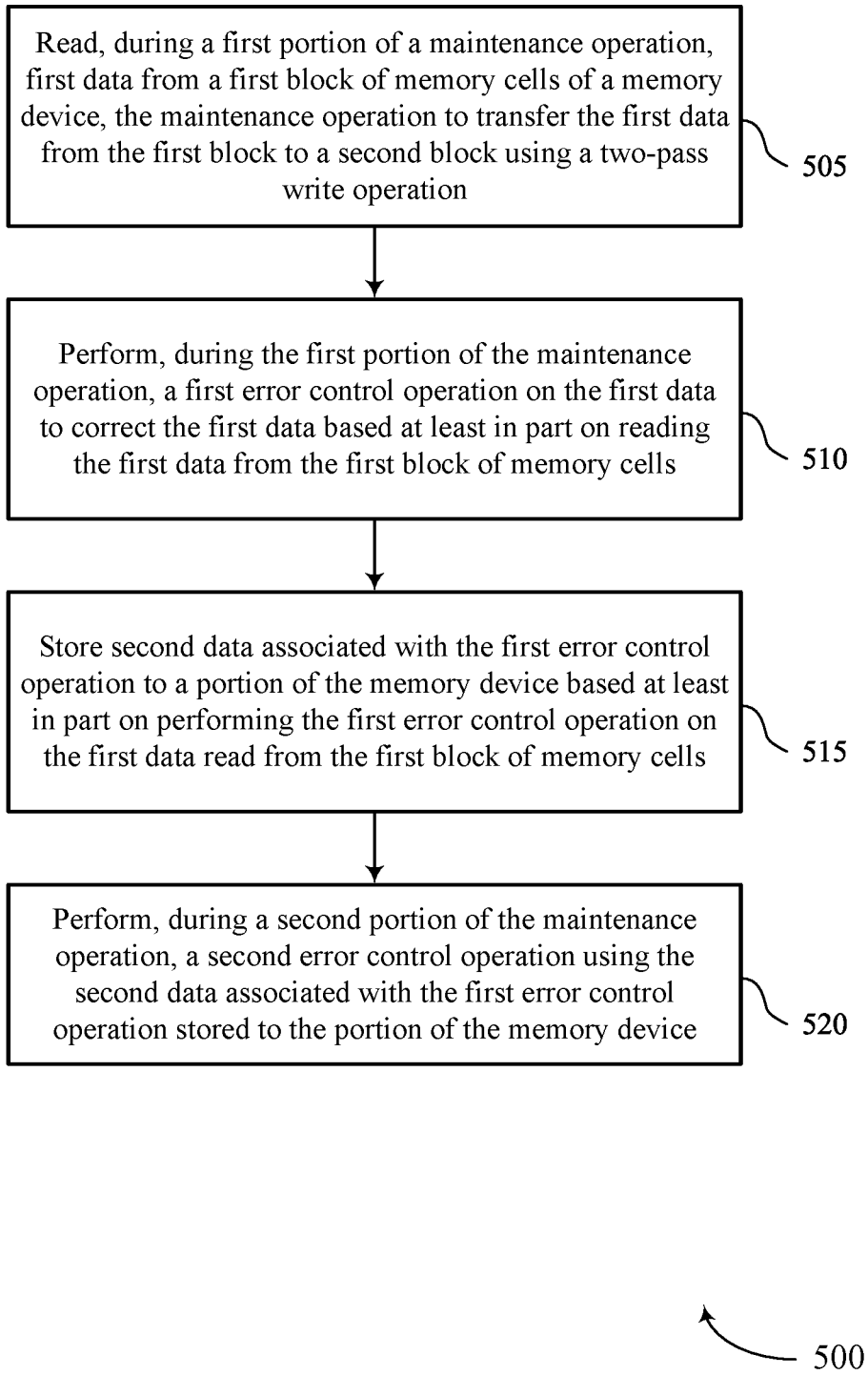
FIG. 5 illustrates a flowchart showing a method or methods that support multi-level cell maintenance operations in accordance with examples as disclosed herein.

FIG. 5 illustrates a flowchart showing a method 500 that supports multi-level cell maintenance operations in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include reading, during a first portion of a maintenance operation, first data from a first block of memory cells of a memory device, the maintenance operation to transfer the first data from the first block to a second block using a two-pass write operation. The operations of 505 may be performed in accordance with examples as disclosed herein.

At 510, the method may include performing, during the first portion of the maintenance operation, a first error control operation on the first data to correct the first data based at least in part on reading the first data from the first block of memory cells. The operations of 510 may be performed in accordance with examples as disclosed herein.

At 515, the method may include storing second data associated with the first error control operation to a portion of the memory device based at least in part on performing the first error control operation on the first data read from the first block of memory cells. The operations of 515 may be performed in accordance with examples as disclosed herein.

At 520, the method may include performing, during a second portion of the maintenance operation, a second error control operation using the second data associated with the first error control operation stored to the portion of the memory device. The operations of 520 may be performed in accordance with examples as disclosed herein.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for reading, during a first portion of a maintenance operation, first data from a first block of memory cells of a memory device, the maintenance operation to transfer the first data from the first block to a second block using a two-pass write operation; performing, during the first portion of the maintenance operation, a first error control operation on the first data to correct the first data based at least in part on reading the first data from the first block of memory cells; storing second data associated with the first error control operation to a portion of the memory device based at least in part on performing the first error control operation on the first data read from the first block of memory cells; and performing, during a second portion of the maintenance operation, a second error control operation using the second data associated with the first error control operation stored to the portion of the memory device.

Aspect 2: The method, apparatus, or non-transitory computer-readable medium of aspect 1, where storing the second data associated with the first error control operation includes operations, features, circuitry, logic, means, or instructions, or any combination thereof for storing one or more parameters associated with the first error control operation to the portion of the memory device, where the second data associated with the first error control operation includes the one or more parameters.

Aspect 3: The method, apparatus, or non-transitory computer-readable medium of aspect 2, further including operations, features, circuitry, logic, means, or instructions, or any combination thereof for reading, during the second portion of the maintenance operation, the first data from the first block of memory cells for a second time and writing, during the second portion of the maintenance operation, a corrected version of the first data to the second block of memory cells based at least in part on performing the second error control operation.

Aspect 4: The method, apparatus, or non-transitory computer-readable medium of any of aspects 1 through 3, further including operations, features, circuitry, logic, means, or instructions, or any combination thereof for writing the first data read from the first block of memory cells of the memory device to a third block of memory cells based at least in part on performing the first error control operation, where each memory cell of the third block of memory cells is configured to store a single bit of data, where storing the second data associated with the first error control operation includes storing a location of the third block of memory cells to the portion of the memory device.

Aspect 5: The method, apparatus, or non-transitory computer-readable medium of aspect 4, further including operations, features, circuitry, logic, means, or instructions, or any combination thereof for reading, during the second portion of the maintenance operation, the first data from the third block of memory cells based at least in part on the location of the third block of memory cells stored to the portion of the memory device and writing, during the second portion of the maintenance operation, the first data read from the third block of memory cells to a fourth block of memory cells, where each memory cell of the fourth block of memory cells is configured to store four or more bits of data.

Aspect 6: The method, apparatus, or non-transitory computer-readable medium of any of aspects 4 through 5, further including operations, features, circuitry, logic, means, or instructions, or any combination thereof for determining that a bit error rate of the first data read from the first block of memory cells satisfies a first threshold based at least in part on performing the first error control operation, where writing the first data to the third block of memory cells is based at least in part on determining that the bit error rate of the first data satisfies the first threshold.

Aspect 7: The method, apparatus, or non-transitory computer-readable medium of any of aspects 4 through 6, further including operations, features, circuitry, logic, means, or instructions, or any combination thereof for determining that a latency associated with performing the first error control operation satisfies a second threshold based at least in part on performing the first error control operation, where writing the first data to the third block of memory cells is based at least in part on determining that the latency associated with performing the first error control operation satisfies the second threshold.

Aspect 8: The method, apparatus, or non-transitory computer-readable medium of any of aspects 4 through 7, further including operations, features, circuitry, logic, means, or instructions, or any combination thereof for receiving, from a host device, a read command associated with the first data prior to performing the second portion of the maintenance operation; reading the first data from the third block of memory cells based at least in part on receiving the read command; and transmitting the first data to the host device based at least in part on reading the data from the third block of memory cells.

Aspect 9: The method, apparatus, or non-transitory computer-readable medium of any of aspects 1 through 8, further including operations, features, circuitry, logic, means, or instructions, or any combination thereof for writing, during a first pass of the two-pass write operation, a corrected version of the first data to the second block using a first type of write operation based at least in part on storing the second data associated with the first error control operation to the portion of the memory device; reading, during the second portion of the maintenance operation, the first data from the first block of memory cells for a second time based at least in part on writing the corrected version of the first data to the second block using the first type of write operation; and writing, during a second pass of the two-pass write operation, the corrected version of the first data to the second block using a second type of write operation different than the first type of write operation based at least in part on performing the second error control operation using the second data.

Aspect 10: The method, apparatus, or non-transitory computer-readable medium of any of aspects 1 through 9, further including operations, features, circuitry, logic, means, or instructions, or any combination thereof for writing, during the first portion of the maintenance operation, the first data read from the first block of memory cells to a fifth block of memory cells based at least in part on performing the first error control operation, where each memory cell of the fifth block of memory cells is configured to store four or more bits of data.

Aspect 11: The method, apparatus, or non-transitory computer-readable medium of any of aspects 1 through 10, where the maintenance operation includes the first portion of the maintenance operation and the second portion of the maintenance operation.

Aspect 12: The method, apparatus, or non-transitory computer-readable medium of any of aspects 1 through 11, where storing the second data to the portion of the memory device includes operations, features, circuitry, logic, means, or instructions, or any combination thereof for storing the second data to a mapping table, a change log, or both of the memory device.

Aspect 13: The method, apparatus, or non-transitory computer-readable medium of any of aspects 1 through 12, where the portion of the memory device includes a volatile memory device.

Aspect 14: The method, apparatus, or non-transitory computer-readable medium of any of aspects 1 through 13, where each memory cell of the first block is configured to store four or more bits of data.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
    one or more memory devices; and
    processing circuitry coupled with the one or more memory devices and configured to cause the memory system to:
        read, during a first portion of a maintenance operation, first data from a first block of memory cells of a first memory device of the one or more memory devices, the maintenance operation to transfer the first data from the first block to a second block using a two-pass write operation;
        perform, during the first portion of the maintenance operation, a first error control operation on the first data to correct the first data based at least in part on reading the first data from the first block of memory cells;
        store second data associated with the first error control operation to a portion of the first memory device based at least in part on performing the first error control operation on the first data read from the first block of memory cells, the second data comprising one or more parameters associated with the first error control operation or a location of a third block of memory cells to which the first data is written based at least in part on whether a condition associated with the first error control operation satisfies a threshold; and
        perform, during a second portion of the maintenance operation, a second error control operation using the second data associated with the first error control operation stored to the portion of the first memory device.

2. The memory system of claim 1, wherein the processing circuitry is further configured to cause the memory system to:
    store the one or more parameters associated with the first error control operation to the portion of the first memory device based at least in part on the condition failing to satisfy the threshold, wherein the second data associated with the first error control operation comprises the one or more parameters.

3. The memory system of claim 2, wherein the processing circuitry is further configured to cause the memory system to:
    read, during the second portion of the maintenance operation, the first data from the first block of memory cells for a second time; and
    write, during the second portion of the maintenance operation, a corrected version of the first data to the second block of memory cells based at least in part on performing the second error control operation.

4. The memory system of claim 1, wherein the processing circuitry is further configured to cause the memory system to:
    write the first data read from the first block of memory cells of the first memory device to the third block of memory cells based at least in part on performing the first error control operation and based at least in part on the condition satisfying the threshold, wherein each memory cell of the third block of memory cells is configured to store a single bit of data, and wherein storing the second data associated with the first error control operation comprises storing the location of the third block of memory cells to the portion of the first memory device.

5. The memory system of claim 4, wherein the processing circuitry is further configured to cause the memory system to:
    read, during the second portion of the maintenance operation, the first data from the third block of memory cells based at least in part on the location of the third block of memory cells stored to the portion of the first memory device; and
    write, during the second portion of the maintenance operation, the first data read from the third block of memory cells to a fourth block of memory cells, wherein each memory cell of the fourth block of memory cells is configured to store four or more bits of data.

6. The memory system of claim 4, wherein the condition comprises a bit error rate, and wherein the processing circuitry is further configured to cause the memory system to:
    determine that the bit error rate of the first data read from the first block of memory cells satisfies the threshold based at least in part on performing the first error control operation, wherein writing the first data to the third block of memory cells is based at least in part on determining that the bit error rate of the first data satisfies the threshold.

7. The memory system of claim 4, wherein the condition comprises a latency associated with the first error control operation, wherein the processing circuitry is further configured to cause the memory system to:
    determine that the latency associated with performing the first error control operation satisfies the threshold based at least in part on performing the first error control operation, wherein writing the first data to the third block of memory cells is based at least in part on determining that the latency associated with performing the first error control operation satisfies the second threshold.

8. The memory system of claim 4, wherein the processing circuitry is further configured to cause the memory system to:
    receive a read command associated with the first data prior to performing the second portion of the maintenance operation;
    read the first data from the third block of memory cells based at least in part on receiving the read command; and transmit the first data based at least in part on reading the data from the third block of memory cells.

9. The memory system of claim 1, wherein the processing circuitry is further configured to cause the memory system to:
write, during a first pass of the two-pass write operation, a corrected version of the first data to the second block using a first type of write operation based at least in part on storing the second data associated with the first error control operation to the portion of the first memory device;
read, during the second portion of the maintenance operation, the first data from the first block of memory cells for a second time based at least in part on writing the corrected version of the first data to the second block using the first type of write operation; and
write, during a second pass of the two-pass write operation, the corrected version of the first data to the second block using a second type of write operation different than the first type of write operation based at least in part on performing the second error control operation using the second data.

10. The memory system of claim 1, wherein the processing circuitry is further configured to cause the memory system to:
write, during the first portion of the maintenance operation, the first data read from the first block of memory cells to a fifth block of memory cells based at least in part on performing the first error control operation, wherein each memory cell of the fifth block of memory cells is configured to store four or more bits of data.

11. The memory system of claim 1, wherein the maintenance operation comprises the first portion of the maintenance operation and the second portion of the maintenance operation.

12. The memory system of claim 1, wherein the processing circuitry is further configured to cause the memory system to:
store the second data to a mapping table, a change log, or both of the first memory device.

13. The memory system of claim 1, wherein the portion of the first memory device comprises a volatile first memory device.

14. The memory system of claim 1, wherein each memory cell of the first block is configured to store four or more bits of data.

15. A non-transitory computer-readable medium storing code comprising instructions, which when executed by one or more processors of an electronic device, cause the electronic device to:
read, during a first portion of a maintenance operation, first data from a first block of memory cells of a memory device, the maintenance operation to transfer the first data from the first block to a second block using a two-pass write operation;
perform, during the first portion of the maintenance operation, a first error control operation on the first data to correct the first data based at least in part on reading the first data from the first block of memory cells;
store second data associated with the first error control operation to a portion of the memory device based at least in part on performing the first error control operation on the first data read from the first block of memory cells, the second data comprising one or more parameters associated with the first error control operation or a location of a third block of memory cells to which the first data is written based at least in part on whether a condition associated with the first error control operation satisfies a threshold; and
perform, during a second portion of the maintenance operation, a second error control operation using the second data associated with the first error control operation stored to the portion of the memory device.

16. The non-transitory computer-readable medium of claim 15, wherein the instructions, when executed by the one or more processors of the electronic device, further cause the electronic device to:
store the one or more parameters associated with the first error control operation to the portion of the memory device based at least in part on the condition failing to satisfy the threshold, wherein the second data associated with the first error control operation comprises the one or more parameters.

17. The non-transitory computer-readable medium of claim 16, wherein the instructions, when executed by the one or more processors of the electronic device, further cause the electronic device to:
read, during the second portion of the maintenance operation, the first data from the first block of memory cells for a second time; and
write, during the second portion of the maintenance operation, a corrected version of the first data to the second block of memory cells based at least in part on performing the second error control operation.

18. The non-transitory computer-readable medium of claim 15, wherein the instructions, when executed by the one or more processors of the electronic device, further cause the electronic device to:
write the first data read from the first block of memory cells of the memory device to the third block of memory cells based at least in part on performing the first error control operation and based at least in part on the condition satisfying the threshold, wherein each memory cell of the third block of memory cells is configured to store a single bit of data, and wherein storing the second data associated with the first error control operation comprises storing the location of the third block of memory cells to the portion of the memory device.

19. The non-transitory computer-readable medium of claim 18, wherein the instructions, when executed by the one or more processors of the electronic device, further cause the electronic device to:
read, during the second portion of the maintenance operation, the first data from the third block of memory cells based at least in part on the location of the third block of memory cells stored to the portion of the memory device; and
write, during the second portion of the maintenance operation, the first data read from the third block of memory cells to a fourth block of memory cells, wherein each memory cell of the fourth block of memory cells is configured to store four or more bits of data.

20. A method, comprising:
reading, during a first portion of a maintenance operation, first data from a first block of memory cells of a memory device, the maintenance operation to transfer the first data from the first block to a second block using a two-pass write operation;
performing, during the first portion of the maintenance operation, a first error control operation on the first data to correct the first data based at least in part on reading the first data from the first block of memory cells;

storing second data associated with the first error control operation to a portion of the memory device based at least in part on performing the first error control operation on the first data read from the first block of memory cells, the second data comprising one or more parameters associated with the first error control operation or a location of a third block of memory cells to which the first data is written based at least in part on whether a condition associated with the first error control operation satisfies a threshold; and performing, during a second portion of the maintenance operation, a second error control operation using the second data associated with the first error control operation stored to the portion of the memory device.

* * * * *